United States Patent [19]

Hollinetz

[11] Patent Number: 4,501,953

[45] Date of Patent: Feb. 26, 1985

[54] METHOD OF AND APPARATUS FOR CONTROLLING APPARATUS FOR PERFORATING STRIPS OF PAPER OR THE LIKE BY DISRUPTIVE SPARK DISCHARGES

[75] Inventor: Walter Hollinetz, Traun, Austria

[73] Assignee: Tann-Papier Gesellschaft m.b.H., Traun, Austria

[21] Appl. No.: 337,830

[22] Filed: Jan. 7, 1982

[30] Foreign Application Priority Data

Jan. 9, 1981 [AT] Austria .................................... 50/81

[51] Int. Cl.[3] ...................... G01N 15/08; G01N 21/00; H05B 7/18

[52] U.S. Cl. ........................................ 219/384; 83/74; 162/263; 250/571; 356/430

[58] Field of Search ................ 219/383, 384, 121 EH, 219/121 LK, 121 LL; 131/281; 250/571, 572, 341; 73/159, 624; 162/262, 263, 286; 83/73, 74; 356/35, 430, 431, 435

[56] References Cited

U.S. PATENT DOCUMENTS

| | | | |
|---|---|---|---|
| 2,220,736 | 11/1940 | Stockbarger et al. | 250/571 |
| 2,967,947 | 1/1961 | Flook | 250/571 |
| 2,979,984 | 4/1961 | Rosen | 250/572 |
| 3,407,650 | 10/1968 | Dickinson | 73/624 |
| 3,435,241 | 3/1969 | Hickey et al. | 73/159 |
| 3,549,858 | 12/1970 | Larive et al. | 219/384 |
| 3,597,616 | 8/1971 | Brunton | 250/341 |
| 3,624,605 | 11/1971 | Aagard | 250/571 |
| 3,783,296 | 1/1974 | Blevins | 250/572 |
| 3,810,005 | 5/1974 | Bennion et al. | 73/159 |
| 3,812,348 | 5/1974 | Lippke | 250/572 |
| 4,006,358 | 2/1977 | Howarth | 250/341 |
| 4,047,029 | 9/1977 | Allport | 162/263 |
| 4,148,065 | 4/1979 | Nakagawa et al. | 250/572 |
| 4,297,559 | 10/1981 | Whitman | 219/121 LK |
| 4,302,105 | 11/1981 | Sick | 250/572 |
| 4,318,180 | 3/1982 | Lundquist et al. | 162/263 |
| 4,345,150 | 8/1982 | Tamura et al. | 250/341 |
| 4,366,712 | 1/1983 | Bathmann et al. | 73/599 |

FOREIGN PATENT DOCUMENTS

| | | | |
|---|---|---|---|
| 364637 | 11/1981 | Austria . | |
| 1213327 | 3/1966 | Fed. Rep. of Germany . | |

*Primary Examiner*—Clifford C. Shaw
*Assistant Examiner*—Geoffrey S. Evans
*Attorney, Agent, or Firm*—Fleit, Jacobson, Cohn & Price

[57] ABSTRACT

A method of and apparatus for controlling apparatus for perforating strips of paper by disruptive spark discharges. The perforate strip passes between two chambers, each of which has an opening facing the strip. Waves transmitted by a transmitter disposed in one of the chambers pass through these openings. The other chamber contains two receivers. The waves which have passed through the perforations are incident on one of the receivers. The waves which have passed through the imperforate area of the paper are incident on the other receiver. The perforating apparatus is controlled in dependence on the difference between the actual and desired values of the difference between the output signals of the two receivers.

3 Claims, 6 Drawing Figures

Figure 1:
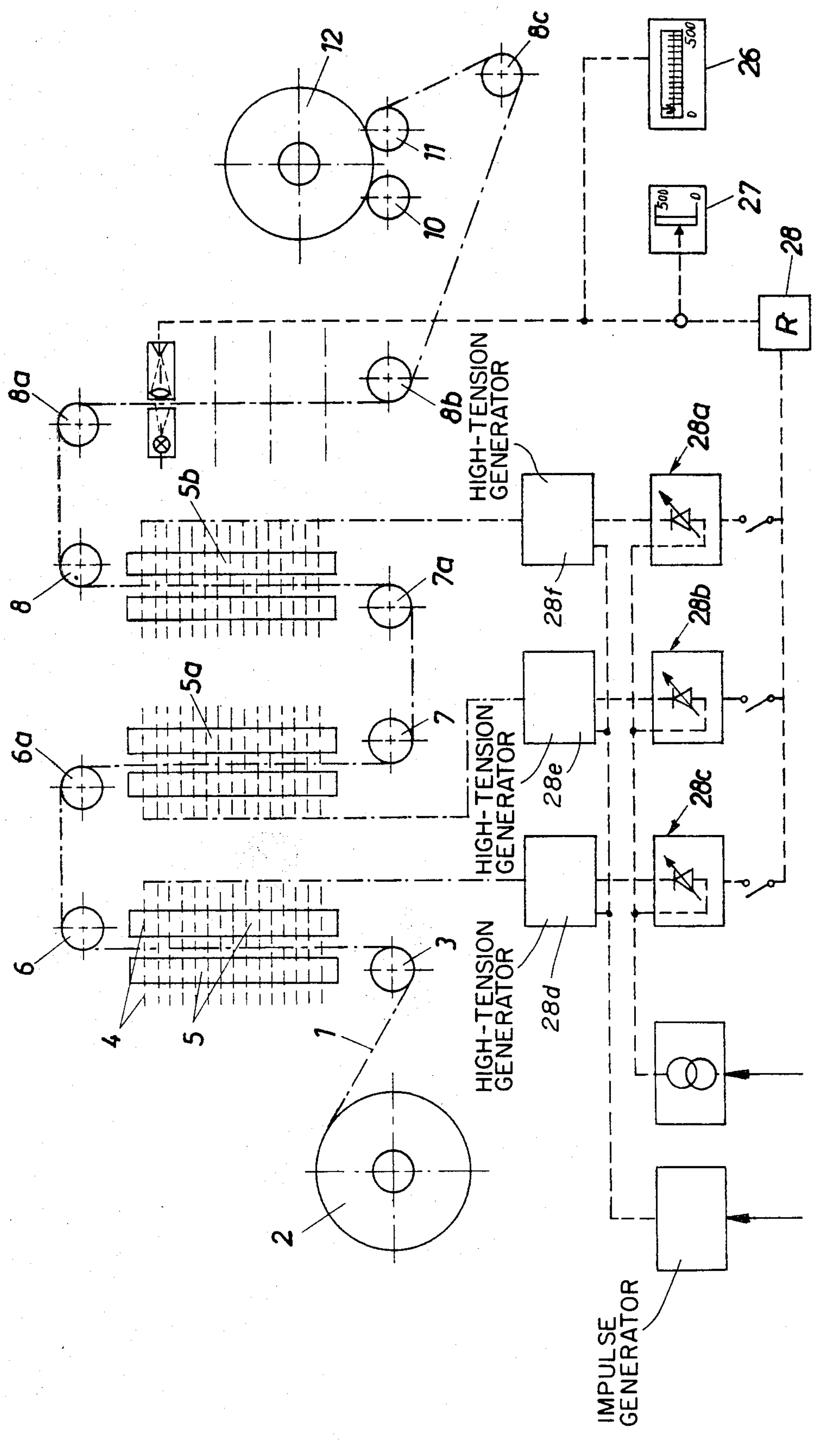

METHOD OF AND APPARATUS FOR CONTROLLING APPARATUS FOR PERFORATING STRIPS OF PAPER OR THE LIKE BY DISRUPTIVE SPARK DISCHARGES

This invention relates to a method of and apparatus for controlling an apparatus for perforating strips of paper or the like by disruptive spark discharges and is particularly intended for use in conjunction with the perforating of cigarette tip coverings and cigarette paper.

It is an object of the present invention to provide measures which ensure that the permeability of the perforation or of rows of perforations to air will be kept within certain limits, e.g., in a range of about 20 to 500 liters per hour per 4 $cm^2$ (Borgwaldt measurement) and which ensure a high uniformity of the perforations.

In the perforating of cigarette top coverings or cigarette papers, a strip of the covering material or paper is passed once or several times between a plurality of pairs of electrodes. The electrodes may be provided in rows on pivoted carriers, as is shown in Austrian Patent Specification No. 364.637, or on rotating rollers, as is disclosed in German Patent Publication No. 1,213.327. In multiple perforating apparatus a plurality of carriers or rollers, which are provided with mutually opposite rows or groups of electrodes, are so arranged one behind the other that the rows of holes formed by the electrodes of the first pair of carriers or rollers are repeatedly perforated by disruptive spark discharges so that particularly the small holes are enlarged whereas the large holes are not appreciably changed.

It has been found that particularly when it is desired to provide a high permeability to air in a single pass of the strip through an interelectrode gap the holes which are formed will differ greatly and the high energy which is used may result in scorched rims around the holes.

In multiple perforating apparatus, less energy is required in each perforation step because the widening of the holes results in a higher permeability to air. Under given conditions regarding voltage level, temperature rise of machine, etc. a desired permeability to air can be achieved with very high uniformity with that method.

It is an object of the present invention to provide measures which result in a highly uniform permeability to air regardless of the fact that irregularities may occur in the manufacture of the raw paper and in the printing thereon and that a non-uniform consumption of the electrodes tend to result in undesired variations of the permeability to air.

For instance, it has been suggested to pneumatically measure the permeability to air under a preset constant vacuum of, e.g. 10 millibars. For that measurement, the test region must be exactly sealed. The pneumatic method involves time delays.

The above-mentioned object is accomplished and the above mentioned disadvantages of the pneumatic method will be avoided if the perforated strip is moved between a transmitter for waves, such as electromagnetic waves in the visible or infrared range, or ultrasonic waves, and receivers for such waves, the waves which have passed through the imperforate portions of the strip are incident on the first receiver, the waves which have passed through the perforate portions of the strip are incident on the second receiver, and the difference between the output signals of the receivers is delivered to a controller for controlling the spark energy in dependence on that difference.

The apparatus for carrying out this method comprises at least two chambers, between which the perforate strip can be moved. One chamber contains a transmitter for waves. The other chamber contains first and second receivers for receiving the waves transmitted by the transmitter. The chambers have slots adjacent to the strip.

According to another feature of the invention that chamber which contains the receiver contains also a lens, which is disposed near the slot which is permeable to the waves. That lens serves to focus the waves onto the receivers.

According to a further feature of the invention that chamber which contains the transmitter contains also a wave stop disposed between the transmitter and the slot which is permeable to the waves.

In accordance with an additional feature of the invention that chamber which contains the transmitter contains also a deflecting mirror, which is disposed between the wave stop and the slot which is permeable to the waves.

In accordance with an additional feature of the invention that chamber which contains the receivers contains also a partition, which is impermeable to the waves and separates the wave paths leading to the first and second receivers.

Figure 2:
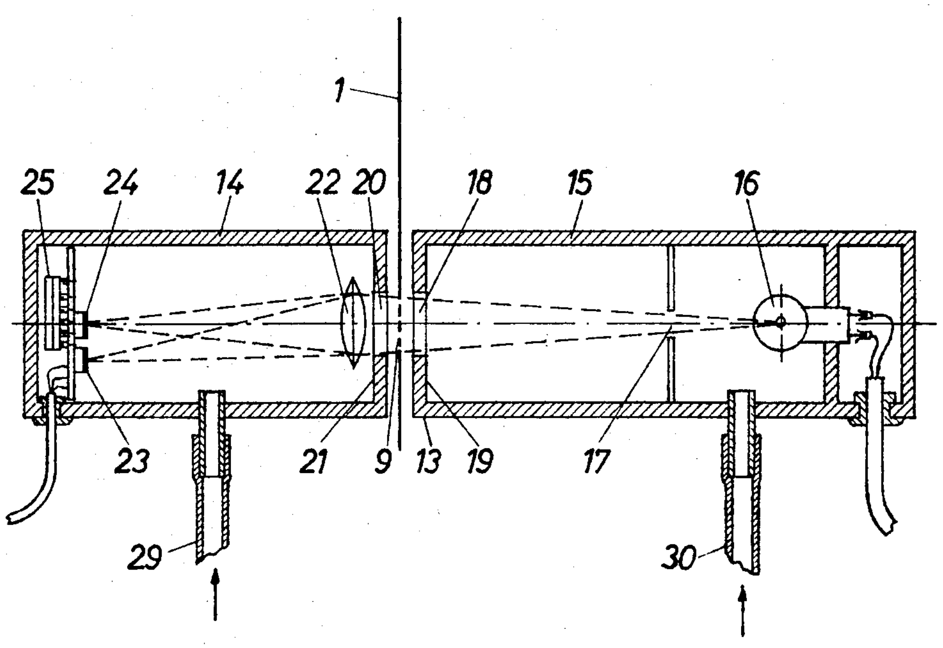

Illustrative embodiments of the apparatus according to the invention are shown on the drawing, in which FIG. 1 is a diagrammatic view showing the entire plant, which includes the perforating apparatus and the control apparatus, FIG. 2 is an axial sectional view showing one embodiment of the measuring apparatus.

Figure 5:
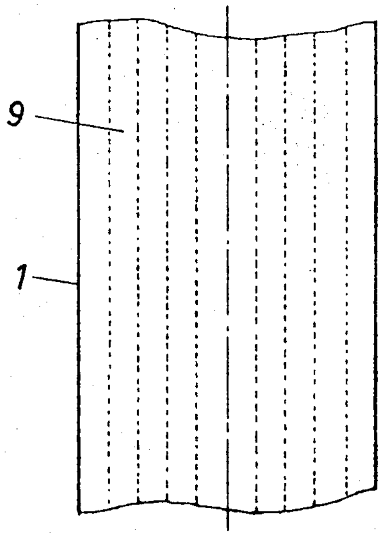
Figure 3:
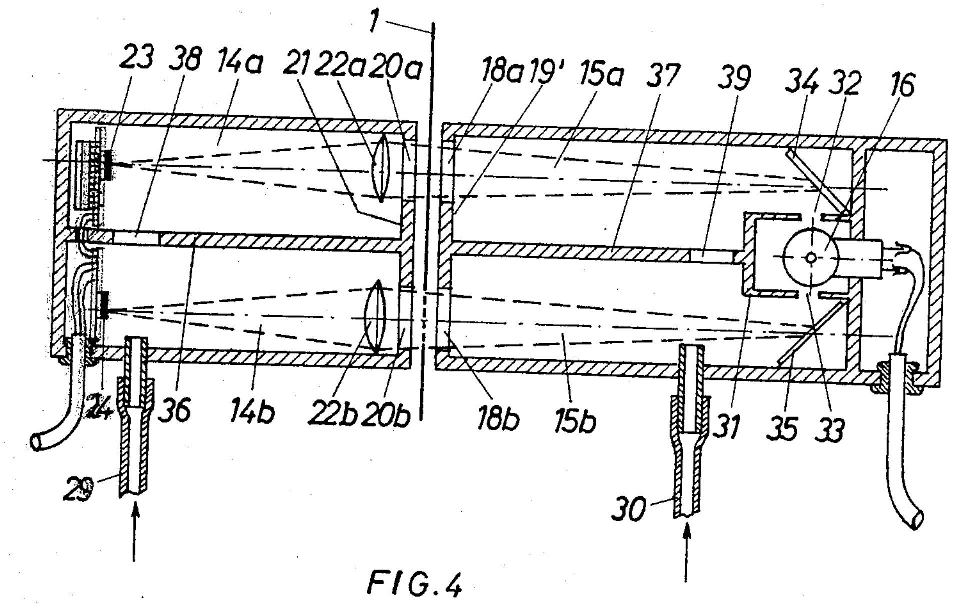
Figure 4:
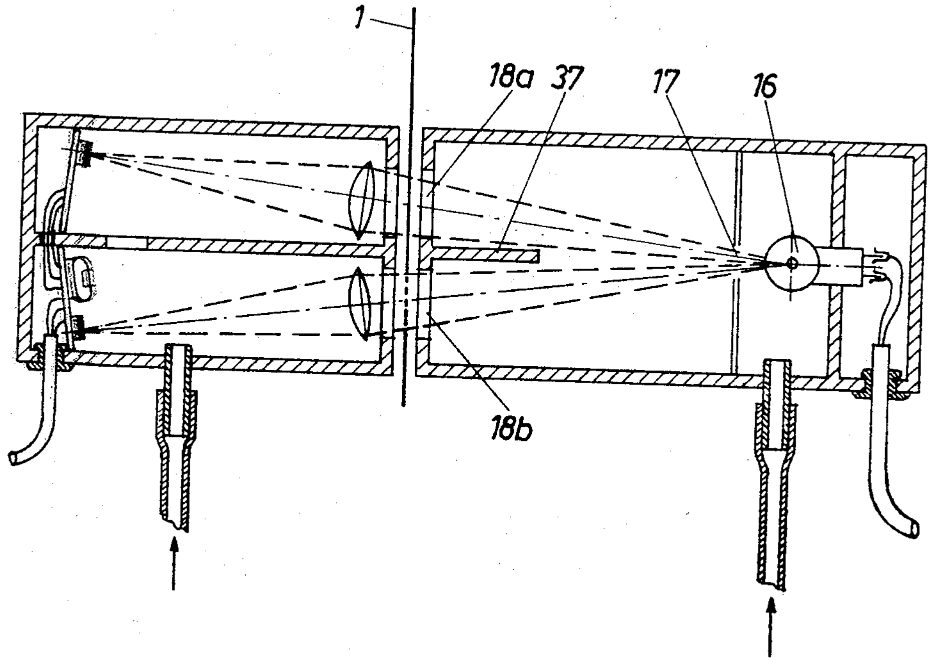
Figure 6:
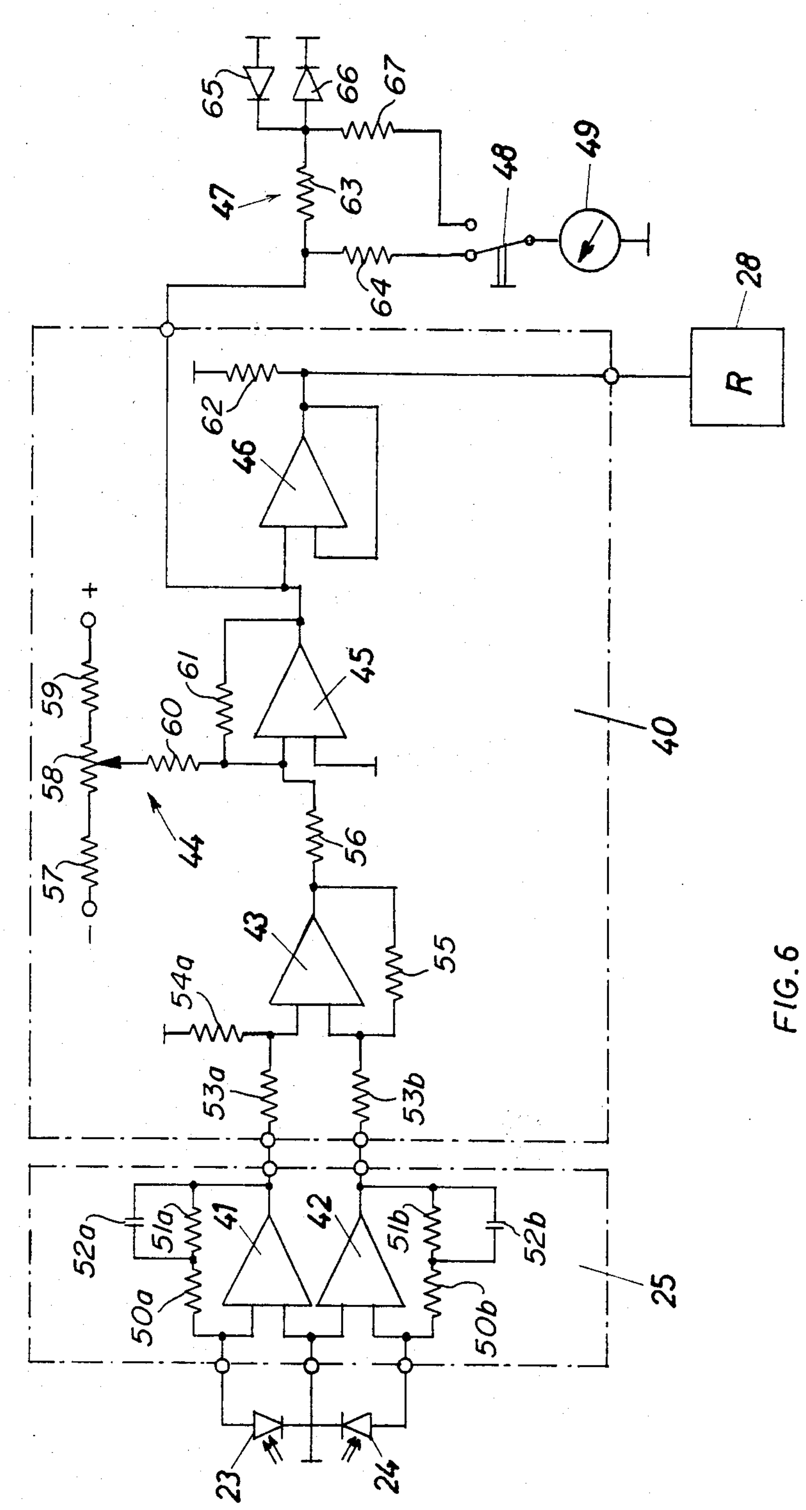

FIGS. 3 and 4 are transverse sectional view similar to FIG. 2 and show two other embodiments of the measuring apparatus, FIG. 5 shows a strip having several rows of perforations and FIG. 6 is a circuit diagram of a signal amplifier connected between the measuring apparatus and the controlling apparatus.

As is apparent from FIG. 1, the strip 1 to be perforated is withdrawn from an uncoiler 2 and moved around a deflecting roller 3 between mutually opposite rows 4 of electrodes of a first electrode array. These electrodes are carried by electrode holders 5, which may be designed as described in Austrian Patent Specification No. 364,637 so that they can be adjusted to extend at a desired angle to the direction of movement of the strip 1. As a result, the mutually opposite rows of electrodes 4 extend at the same angle to the direction of movement of the strip 1. That angle will determine the spacing of the rows of perforations formed by the mutually opposite electrodes. In the present embodiment there are three groups of pairs of carriers 5, 5*a*, 5*b* as well as two pairs of deflecting rollers 6, 6*a* and 7, 7*a* which serve to guide the strip 1 from one electrode array to the other. In the present embodiment the strip moves from bottom to top through the first electrode array, from top to bottom through the second electrode array, and from bottom to top through the third electrode array. All three pairs of carriers 5, 5*a*, 5*b* are set to the same angle so that the sparks in the second and third arrays are discharged through the holes formed by the first array.

When the strip 1 has passed through the last electrode array, the strip is guided by deflecting rollers 8, 8*a*, 8*b* to move through the measuring apparatus.

As is shown in FIG. 5, rows of perforations in e.g., four fields may be formed in each strip. Each array comprises a pair of carriers 5 or 5*a* or 5*b* (FIG. 1) for each field. All pairs of carriers are set to the same angle. If such strip 1 is to be used as a cigarette tip covering, the strip 1 will be wound around the adjacent ends of two coaxially disposed cigarettes and the two cigarettes will then be severed from each other by a cut at the center of the covering strip along the line indicated in phantom in FIG. 5. Each tip has rows of perforations in two fields. In such case a separate measuring apparatus is provided for the rows of perforations in each field. Only one measuring apparatus is diagrammatically shown in FIG. 1. The remaining three measuring apparatus are indicated by successive dash-dot lines. The strip which has moved through the measuring apparatus is contacted by a deflecting roller 8*c* and rollers 10, 11 and is wound up on an upcoiler 12.

As is apparent from FIG. 2, the measuring apparatus may comprise a single cavity 13, which consists of two chambers 14, 15. The strip 1 is moved between said chambers at right angles to the plane of the drawing. The chamber 15 contains a point source of light 16. The light from the source 16 passes through a wave stop 17 and a slot 18 in an end wall 19 and then through the rows of perforations in the field 9 and thereafter through a slot 20 in the end wall 21 into the chamber 14, in which the light passes through a lens 22 disposed close to the slot 20. The lens 22 focusses the light from the light source 16 which has passed through the perforations in field 9 directly onto a photocell 24. The scattered light which has passed through the imperforate region of the field 9 is incident on a photocell 23. The signals from the two photocells 23, 24 are delivered via a preamplifier 25 to a signal amplifier, which is not shown in FIG. 2 and will be described hereinafter. The output signals of the signal amplifier are delivered to an actual-value indicator 26 and to a controller 28. A set point adjuster 27 for adjusting a desired value is also connected to the controller 28. When the actual value differs from the desired value which has been adjusted, the controller 28 will deliver a control signal to the power selectors 28*a*, 28*b*, 28*c* so that the spark energies are adjusted to the optimum values.

To prevent an accumulation of dust on the lens 22 and the point source of light 16, each of the chambers 14 and 15 may be connected to an air blast duct 29 or 30, which discharges a stream of air flowing through the chambers 14 or 15 toward the slot 20 or 18. As a result, an ingress of dust particles from the holes in the perforate fields of the strip 1 into the chambers 14 and 15 will be prevented.

Instead of undivided chambers, as shown in FIG. 2, the measuring apparatus may comprise two-compartment chambers, as shown in FIGS. 3 and 4. In accordance with FIG. 3, each of the chambers 14 and 15 is divided into two compartments 14*a*, 14*b* and 15*a*, 15*b*. The light source 16 is accommodated in a housing 31, from which the light passes through wave stops 32 and 33 and is incident on deflecting mirrors 34 and 35, which are accommodated in respective compartments 15*a* and 15*b*. The two compartments 15*a* and 15*b* have a common end wall 19', which is formed with two slots 18*a* and 18*b*, which lead into respective compartments 15*a*, 15*b*. The two compartments 14*a*, 14*b* have a common end wall 21, which is formed with respective slots 20*a*, 20*b*. Two lenses 22*a*, 22*b* are disposed behind respective slots 20*a*, 20*b*. The slots 18*b*, 20*b* are disposed adjacent to a perforate zone of the strip 1 and the slots 18*a*, 20*a* adjacent to an imperforate zone of the strip 1. As a result, the light which is reflected by the deflecting mirror 34 into the slot 18*a* is incident on a photocell 23 in compartment 14*a* and the light which is reflected by the deflecting mirror 35 into the slot 18*b* is incident on a photocell 24 in compartment 14*b*.

The measurement is taken as in the apparatus of FIG. 2. Each of the partitions 36, 37 in the compartments 14 and 15, respectively, is formed with an opening 38 or 39, which is flown through by an air stream in order to prevent an accumulation of dust on the lenses, the light source and the mirrors.

The apparatus shown in FIG. 4 resembles the embodiment shown in FIG. 3 with the difference that as in the embodiment shown in FIG. 2 the light from the light source 16 passes through a wave stop 17, which is parallel to the strip 1. Moreover, the transverse wall 37 is only short so that the light from the light source 16 passes partly through the slot 18*a* to an imperforate track and partly through the slot 18*b* to a perforate track.

FIG. 6 is a circuit diagram of an illustrative embodiment of a signal amplifier. The photocells 23 and 24 deliver their output signals to first and second preamplifiers 41, 42, respectively, which consist of operational amplifiers and are supplied with suitable supply voltages and include between their input and output terminals a suitable resistance-capacitance network (not identified) so that the desired gain and frequency response are obtained. The output terminals of the preamplifiers 41, 42 are connected by coupling resistors (not identified) to the input terminals of a differential amplifier 43, which is arranged for a negative feedback, as usual. The output terminal of the differential amplifier 43 is connected by a coupling resistor (not identified) to an operational amplifier 45, which is also arranged for a negative feedback and serves to zero the measuring apparatus. For this purpose a d.c. signal is delivered to the operational amplifier 45 via a variable voltage divider 44. That signal is added to the signal delivered by the differential amplifier 43 to the input terminal of the operational amplifier 45. The output signal of the operational amplifier is delivered to an operational amplifier 46, which constitutes an output stage, and via a resistance network 47 and a change-over switch 48 to a zero-indicating instrument 49. When the change-over switch 48 is in the position shown, a coarse zero adjustment can be effected; a fine adjustment can be effected in the other position. The output terminal of the operational amplifier 46 is connected to the actual-value input terminal of the controller 28, which consists preferably of a PID controller. Only imperforate paper is first introduced into the cavity 13 for a zero adjustment so that the two photocells 23, 24 deliver signals having substantially the same magnitude to the preamplifier 25, which is connected to the signal amplifier 40. The circuit is then exactly zeroed by course and fine adjustments effected by means of the variable voltage divider 44. Thereafter the perforating operation can be initiated. The (unidentified) diodes in the resistance network 47 prevent an overloading of the indicating instrument 49.

Resistors 50*a*, 50*b*, 51*a*, and 51*b*, together with the capacitors 52*a*, and 52*b*, form an inverse feedback network which determines the amplification and the frequency curve of preamplifiers 41 and 42. Resistors 53*a*, 53*b* are connecting resistances for the differential amplifier 43. Resistor 54*a* is a highly resistive shunting resistance for one input of the differential amplifiers, whereas resistor 55 is connected between the output and the other input of amplifier 43 and determines the amplification thereof. Resistor 56 is a shunting resistance for the amplifier 45 which constitutes part of a zero-balancing network. Resistors 57, 59, and 60, together with the potentiometer 58, form a variable bias voltage source for the amplifier 45, whereas resistor 61 determines the amplification factor. Resistor 62 serves as a terminating resistance for the amplifier 46, the amplification factor of which is unity since the output is connected with one of the inputs. Resistor 64 serves a shunting resistance for the indicating instrument 49 which shows the degree of perforation in the illustrated position of switch 48.

If switch 48 is switched over, resistors 63 and 67 together with the diodes 65, 66 serve as voltage divider for the zero-balancing network. This is effected so that an imperforate strip 1 is used and that the potentiometer 58 is adjusted as long as the indicating instrument 49 shows a null value. Thereafter, the apparatus can be put into operation and perforated strips 1 can be used.

What is claimed is:

1. In an apparatus for perforating a perforate strip of material by disruptive spark discharge wherein the improvement comprises:

at least two chambers, means for guiding and moving the perforate strip between said chambers, a transmitter disposed in one of said chambers for transmitting electromagnetic waves, first and second receivers disposed in the other of said chambers and being adapted to receive electromagnetic waves transmitted by the transmitter and for generating respective signals, said chambers being provided with slots adjacent to the strip for passing said electromagnetic waves, and discharge control means for varying the intensity of spark discharges in dependence of the difference between said signals, wherein the chamber which contains the receivers includes a lens disposed near the slot that is permeable to the electromagnetic waves, and said lens serves to focus the waves at the receivers, and wherein the chamber which contains the transmitter includes a wave stop disposed between the transmitter and the slot which is permeable to the electromagnetic waves.

2. In an apparatus for perforating a perforate strip of material by disruptive spark discharge wherein the improvement comprises:

at least two chambers, means for guiding and moving the perforate strip between said chambers, a transmitter disposed in one of said chambers for transmitting electromagnetic waves, first and second receivers disposed in the other of said chambers and being adapted to receive electromagnetic waves transmitted by the transmitter and for generating respective signals, said chambers being provided with slots adjacent to the strip for passing said electromagnetic waves, and discharge control means for varying the intensity of said spark discharges in dependence of the difference between said signals, wherein the chamber which contains the transmitter includes two deflecting mirrors disposed between the transmitter and the slots which are permeable to the waves to produce two wave paths leading to the first and second receivers, wherein a wave stop is disposed between the transmitter and each deflecting mirror, wherein the chamber which contains the receivers includes a partition which is impermeable to the waves and separates said two wave paths leading to the first and second receivers, wherein the chamber which contains the transmitter includes a partition which is impermeable to the waves and separates said two wave paths leading to the first and second receivers, and wherein in the chamber which contains the receivers in each of said two wave paths a lens is disposed near the slot that is permeable to the waves and said lens serves to focus the waves at the receivers.

3. In an apparatus for perforating a perforate strip of material by disruptive spark discharge wherein the improvement comprises:

at least two chambers, means for guiding and moving the perforate strip between said chambers, a transmitter disposed in one of said chambers for transmitting electromagnetic waves, first and second receivers disposed in the other of said chambers and being adapted to receive electromagnetic waves transmitted by the transmitter and for generating respective signals, said chambers being provided with slots adjacent to the strip for passing said electromagnetic waves, and discharge control means for varying the intensity of said spark discharges in dependence of the difference between said signals, wherein the chamber which contains the transmitter includes a wave stop disposed between the transmitter and the slots and a partition which is impermeable to the waves and separates the waves in two wave paths leading to the first and second receivers, wherein in the chamber which contains the receivers in each of said two wave paths a lens is disposed near the slot that is permeable to the waves, and said lens serves to focus the waves at the receivers, and wherein the chamber which contains the receivers includes a partition which is impermeable to the waves leading to the first and second receivers.

* * * * *